(12) United States Patent
Painter et al.

(10) Patent No.: US 10,255,461 B2
(45) Date of Patent: Apr. 9, 2019

(54) SECURE DEVICE CHAMBER

(71) Applicant: LENOVO (Singapore) PTE. LTD., New Tech Park (SG)

(72) Inventors: Alan Ladd Painter, Cary, NC (US); Omar Ali Ali, Morrisville, NC (US); George O. Diatzikis, Apex, NC (US); Marc Richard Pamley, Durham, NC (US); Bryan Loyd Young, Tualatin, OR (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 414 days.

(21) Appl. No.: 15/086,695

(22) Filed: Mar. 31, 2016

(65) Prior Publication Data
US 2017/0286720 A1    Oct. 5, 2017

(51) Int. Cl.
*G06F 21/70*    (2013.01)

(52) U.S. Cl.
CPC .................................. *G06F 21/70* (2013.01)

(58) Field of Classification Search
CPC ........... G06F 2003/0692; G06F 1/1677; G06F 1/187; G06F 21/70
See application file for complete search history.

(56) References Cited

U.S. PATENT DOCUMENTS 5,253,129 A * 10/1993 Blackborow ............. G06F 1/18
   360/69
5,737,185 A *  4/1998 Morrison ................ G06F 1/184
   360/99.07

\* cited by examiner

*Primary Examiner* — James Wu
(74) *Attorney, Agent, or Firm* — Kunzler, PC

(57) ABSTRACT

For a secure device chamber, the device chamber is disposed in a chassis and includes a device port. A door latches to obstruct access to the device chamber. A logic circuit receives an uninterrupted power supply from a computer, stores a device access value, and unlatches the door in response to activation of a chamber eject button and a device access value not being a device secure mode.

19 Claims, 10 Drawing Sheets

SECURE DEVICE CHAMBER

FIELD

The subject matter disclosed herein relates to a device chamber and more particularly relates to a secure device chamber.

BACKGROUND

Description of the Related Art

Computers often include removable devices.

BRIEF SUMMARY

An apparatus for a secure device chamber is disclosed. The apparatus includes a device chamber, a door, a chamber eject button, and a logic circuit. The device chamber is disposed in a chassis and includes a device port. The door latches to obstruct access to the device chamber. The logic circuit receives an uninterrupted power supply from a computer, stores a device access value, and unlatches the door in response to activation of the chamber eject button and a device access value not being a device secure mode. A method and system also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
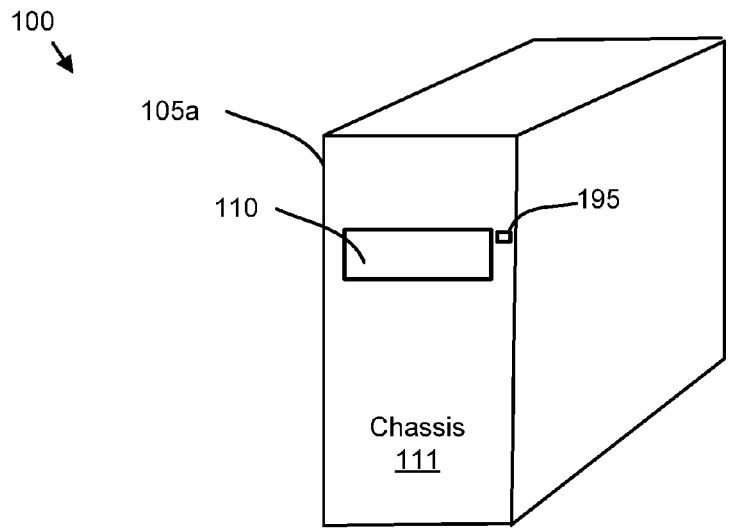
FIG. 1A is a perspective drawing illustrating one embodiment of a device chamber system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of a device chamber system 100. The device chamber system 100 may include an apparatus 110 that securely mounts a device within a chassis 111 of a computer 105a. The device may be a removable storage device such as a Serial Advanced Technology Attachment (SATA) drive, a Universal Serial Bus (USB) drive, of the like. These devices are typically mounted at a port of the computer 105a and after mounting are in communication with the computer 105a. While mounted, data from the devices may be used by the computer.

Unfortunately, if the device is removed from the computer 105a without being dismounted, data may be lost or corrupted. The embodiments described herein provide a device chamber with a door that latches to obstruct access to the device chamber. The device may be connected to a device port within the device chamber. The device may only be removed if a chamber eject button 195 is activated and if the embodiments determine that the device may be securely removed without data loss as will be described hereafter.

Figure 1B:
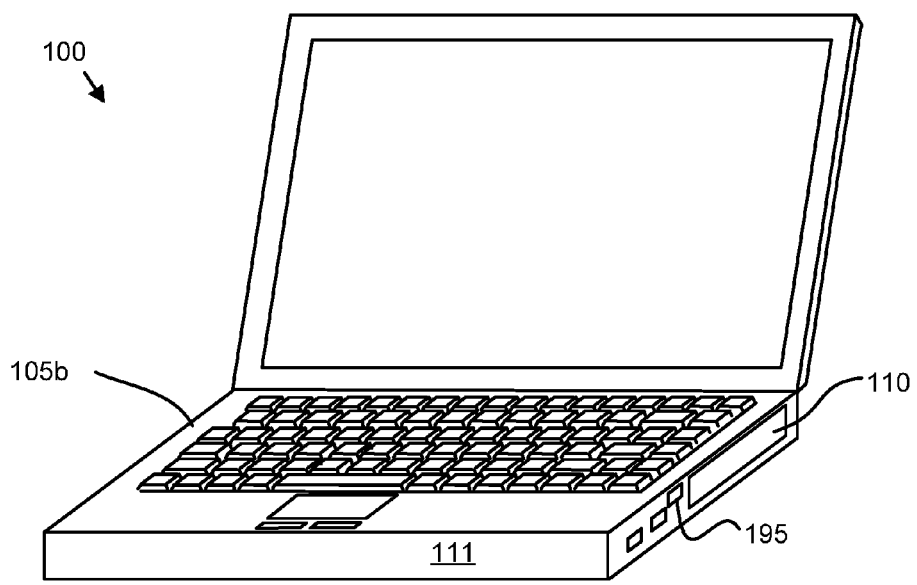
FIG. 1B is a perspective drawing illustrating one alternative embodiment of a device chamber system.

FIG. 1B is a perspective drawing illustrating one alternative embodiment of a device chamber system 100. In the depicted embodiment, the apparatus 110 is disposed in a laptop computer 105b. A device may be removed from the device chamber in response to activation of the chamber eject button 195 and the satisfaction of additional criteria as will be described hereafter.

Figure 1C:
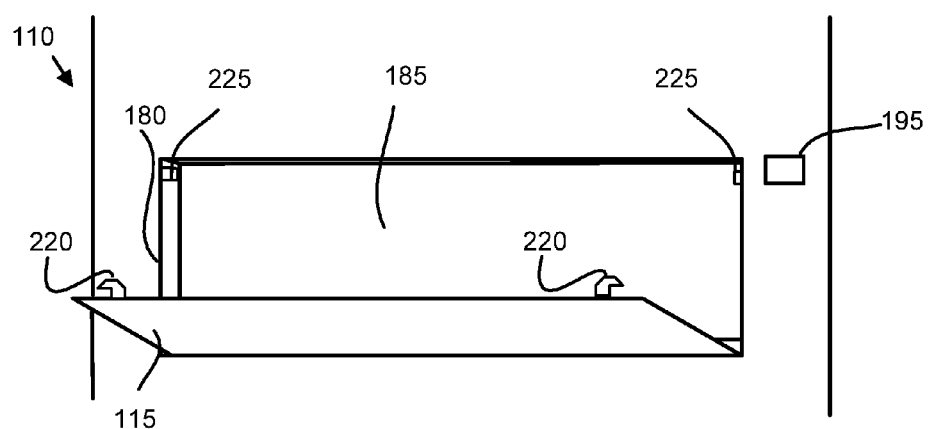
FIG. 1C is a perspective drawing illustrating one embodiment of a device chamber with device.

FIG. 1C is a perspective drawing illustrating one embodiment of a device chamber 180 with device 185. The device chamber 180 and a door 115 enclose a device 185 mounted to a device port. The device 185 may be a 3.5 inch SATA drive, a 2.5 inch SATA drive, or the like. A door 115 is shown in an unlatched and open position. The door 115 may be latched when one or more brackets 225 extend to engage corresponding latch hooks 220. The door 115 may be unlatched in response to activation of the chamber eject button 195 and the satisfaction of other criteria as will be described hereafter.

Figure 1D:
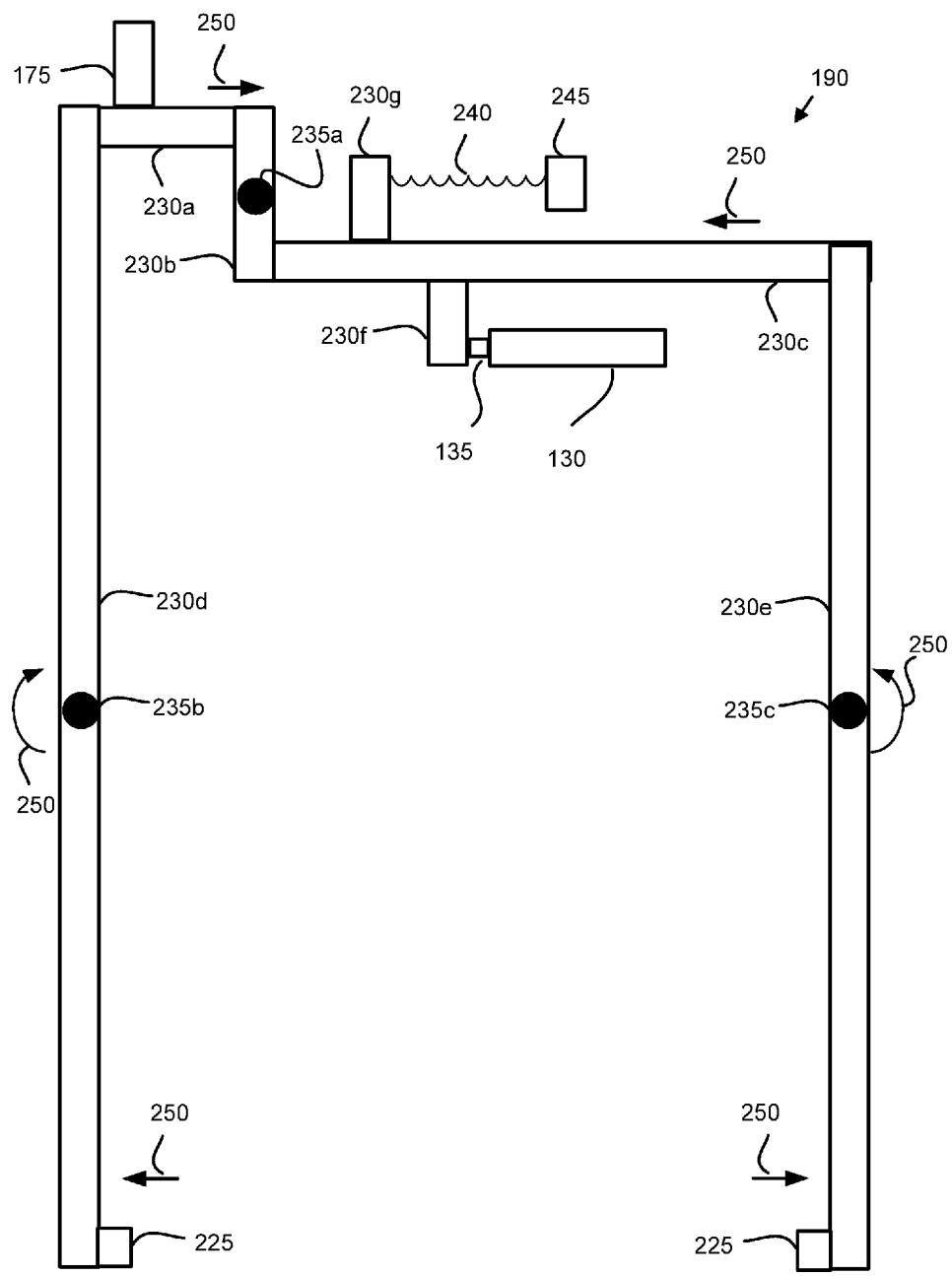
FIG. 1D is a top view drawing illustrating one embodiment of a latch with a failsafe release.

FIG. 1D is a top view drawing illustrating one embodiment of a latch 190 with a failsafe release 175. In the depicted embodiment, the latch 190 includes one or more connectors 230a-g, one or more pivots 235a-c, the failsafe release 175, a spring 240, a chassis attachment 245, a latch pin 135, a latch solenoid 130, and the one or more brackets 225.

The spring 240 may be connected to the chassis attachment 245. The chassis attachment 245 may be attached to the chassis 111 and fixed relative to the latch 190. As a result, the spring 240 may apply tension to a seventh connector 230g. The tension of the spring 240 may motivate the connectors 230a-g in an opposite direction of the movement arrows 250 so that the brackets 225 continue to engage the latch hooks 220 and latch the door 115.

In one embodiment, the latch solenoid 130 motivates latch pin 135 to motivate a sixth connector 230f. Alternatively, the failsafe release 175 may motivate a first connector 230a. The failsafe release 175 may be disposed within the chassis 111 of the computer 105. A user with access inside the chassis 111 may motivate the failsafe release 175 to unlatched the door 115. In response to the motivation by the latch solenoid 130 and/or the failsafe release 175, the connectors 230a-g may move as indicated by the movement arrows 250, causing the brackets 225 to release the latch hooks 220 and unlatch the door 115.

Figure 1E:
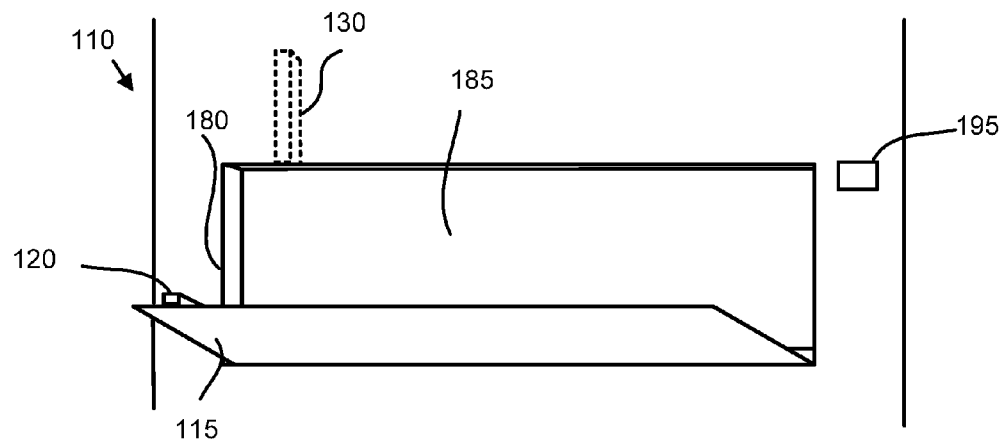
FIG. 1E is a perspective drawing illustrating one embodiment of a Device chamber with device.

FIG. 1E is a perspective drawing illustrating one embodiment of a device chamber 180 with device 185. The device chamber 180 and a door 115 enclose a device 185 mounted to a device port. The device 185 may be a 3.5 inch SATA drive, a 2.5 inch SATA drive, or the like. A door 115 is shown in an unlatched and open position. The door 115 may be latched when a latch solenoid 130, shown as a hidden line component, retracts a latch pin from a latch sleeve 120. The door 115 may be unlatched in response to activation of the chamber eject button 195 and the satisfaction of other criteria.

Figure 1F:
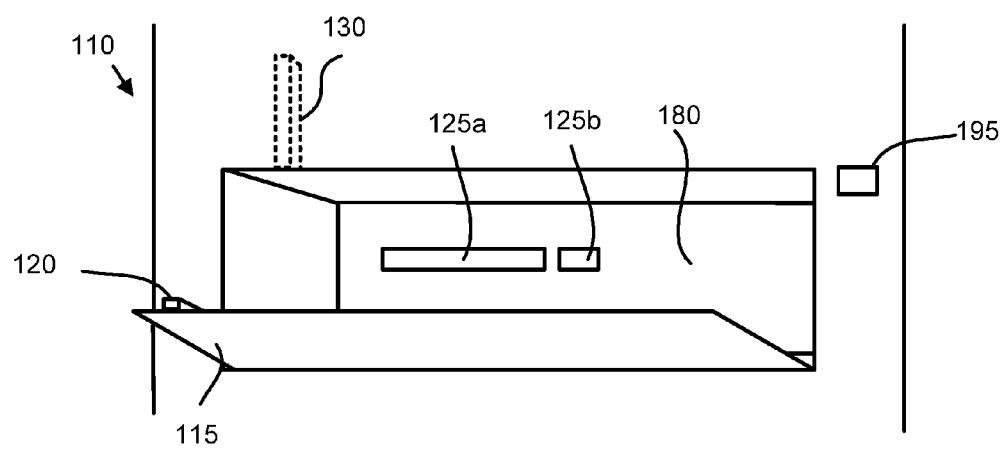
FIG. 1F is a perspective drawing illustrating one embodiment of a device chamber.

FIG. 1F is a perspective drawing illustrating one embodiment of the device chamber 180 without the device 185. One or more device ports 125a-b are shown within the device chamber 180. In one embodiment, the device ports 125a-b may be SATA connectors.

Figure 1G:
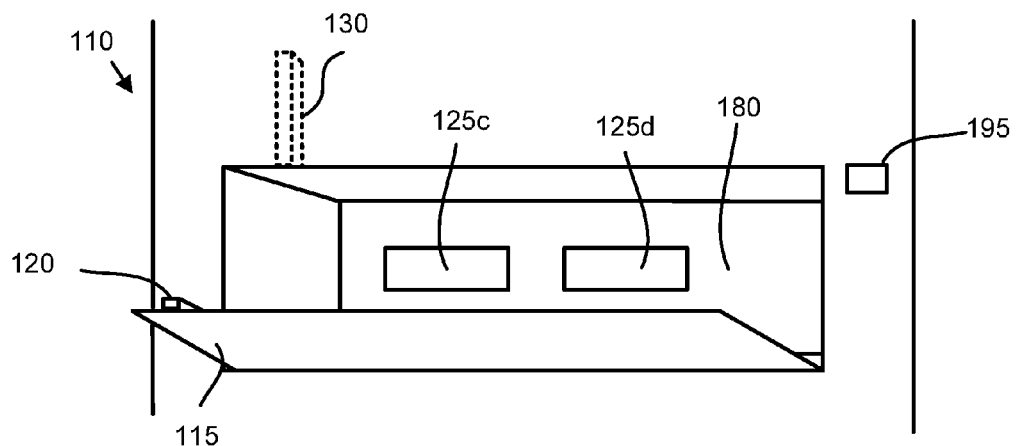
FIG. 1G is a perspective drawing illustrating one alternate embodiment of a device chamber.

FIG. 1G is a perspective drawing illustrating one alternate embodiment of the device chamber 180 without the device 185. One or more device ports 125c-d are shown within the device chamber 180. In one embodiment, the device ports 125c-d may be USB ports. The embodiments may be practiced with any device port.

Figure 1H:
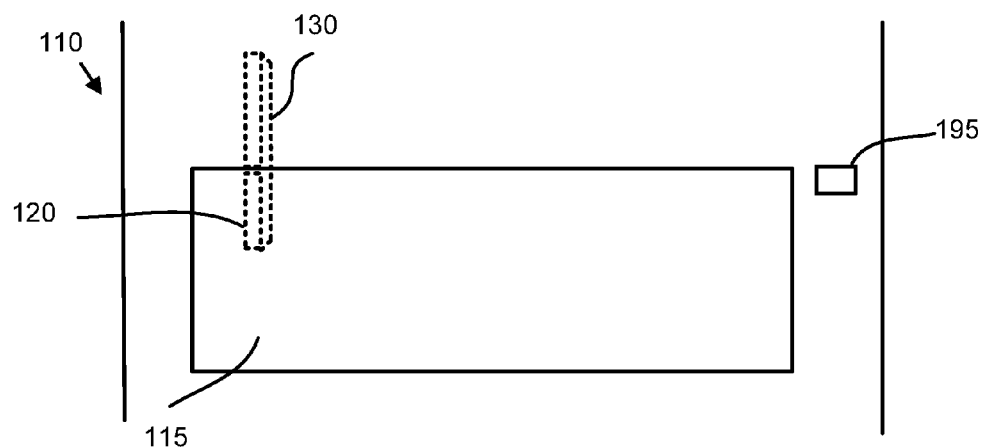
FIG. 1H is a perspective drawing illustrating one embodiment of a device chamber with a latched door.

FIG. 1H is a perspective drawing illustrating one embodiment of a device chamber 180 with a latched door 115. In the depicted embodiment, the door 115 is closed, obstructing access to the device chamber 180. A latch pin may extend from the latch solenoid 130 into the latch sleeve 120 to latch the door 115 in place. If the door 115 is latched, the device 185 may not be removed from the device chamber 180.

Figure 1I:
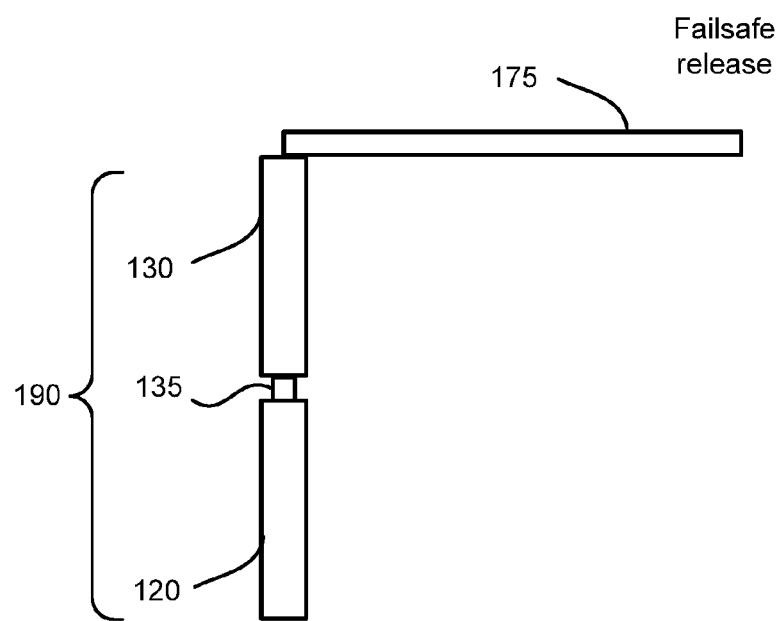
FIG. 1I is a front view drawing illustrating one alternative embodiment of a latch with failsafe release.

FIG. 1I is a front view drawing illustrating one alternate embodiment of a latch 190 with a failsafe release 175. In the depicted embodiment, the latch 190 includes the latch solenoid 130, the latch pin 135, and the latch sleeve 120. The latch pin 135 extends into the latch sleeve 120 to latch the door 115. The latch solenoid 130 may withdraw the latch pin 135 from the latch sleeve 120 to unlatched the door 115.

In one embodiment, the failsafe release 175 may also withdraw the latch pin 135 from the latch sleeve 120. Thus the failsafe release 175 may release the door 115 to permit access to the device chamber 180 and/or the device port 125. The failsafe release 175 may be disposed within the chassis 111 of the computer 105. A user with access to the failsafe release 175 may manipulate the failsafe release 175 to release the door 115.

Figure 2:
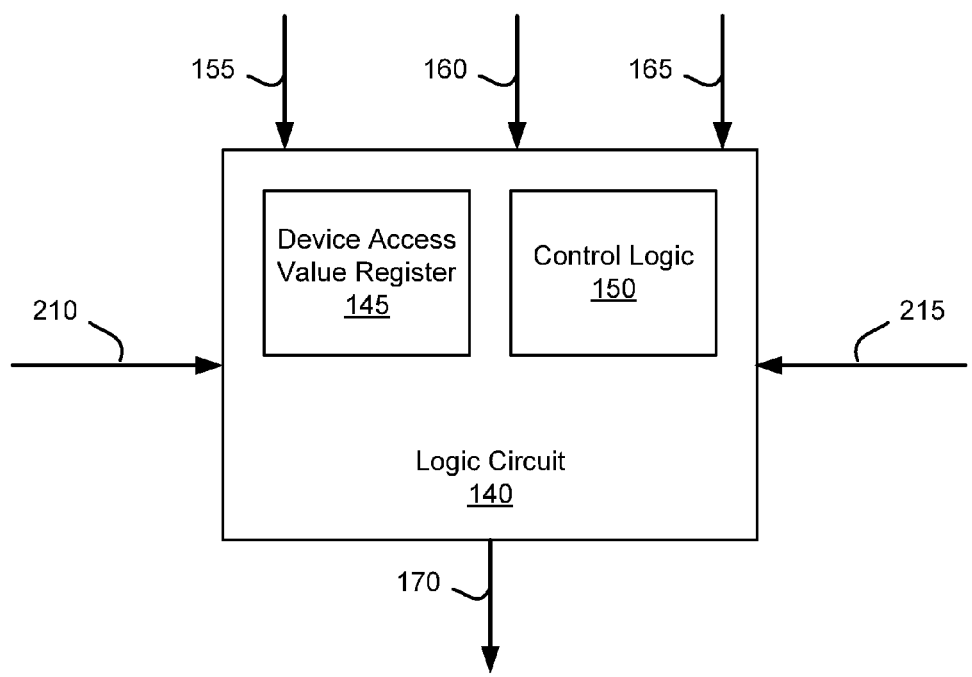
FIG. 2 is a schematic block diagram illustrating one embodiment of a logic circuit.

FIG. 2 is a schematic block diagram illustrating one embodiment of a logic circuit 140. The logic circuit 140 may be included within the apparatus 110. The logic circuit 140 may be embodied in a semiconductor programmable logic device. Alternatively, the logic circuit 140 may be embodied in a custom semiconductor device, a chipset, or the like. In the depicted embodiment, the logic circuit 140 includes a device access value register 145 and control logic 150. The logic circuit 140 may further receive a chamber eject button activation signal 210, a device installed signal 215, an uninterrupted power supply 155, a command bus 160, and a computer status signal 165. The logic circuit 140 may further generate a latch solenoid control 170 that activates the latch solenoid 130.

The chamber eject button activation signal 210 may be asserted when a user activates the chamber eject button 195. The device installed signal 215 may be asserted if the device 185 is installed device chamber 180 and/or mounted in the device port 125. The uninterrupted power supply 155 may be received from the computer 105. The uninterrupted power supply 155 may supply power even when the computer 105 is off and/or in a standby mode, as well as when the computer 105 is powered on.

The command bus 160 may be a serial bus, a parallel bus, or the like. The command bus 160 may carry communications between the logic circuit 140 and a processor. The computer status signal 165 may indicate a status of the computer 105. The status may include powered off, powered on, and one or more standby modes. The standby modes may include S5, S4, and S3 standby modes.

The device access value register 145 may store a device access value. The device access value may be a device secure mode or a device released mode. The control logic 150 may determine whether to assert the latch solenoid control 170 and unlatch the door 115 based on combinations of the chamber eject button activation signal 210, the device installed signal 215, messages communicated over the command bus 160, the computer status signal 165, and the device access value stored in the device access value register 145 as will be described hereafter.

Figure 3:
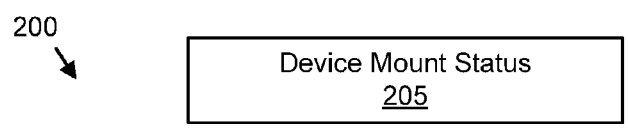
FIG. 3 is a schematic block diagram illustrating one embodiment of device data.

FIG. 3 is a schematic block diagram illustrating one embodiment of device data 200. The device data 200 may be organized as a data structure stored in a memory of the computer 105. In the depicted embodiment, the device data 200 includes a device mount status 205. The device mount status 205 may specify whether the device 185 is mounted to the device port 125 and/or computer 105 or unmounted from the device port 125 and/or computer 105.

Figure 4:
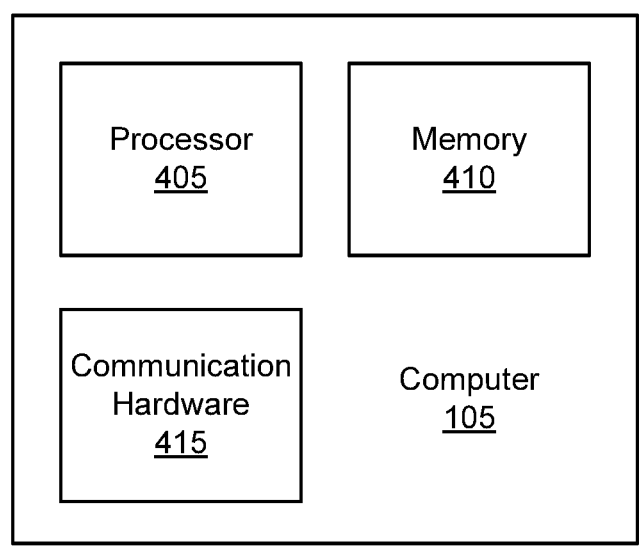
FIG. 4 is a schematic block diagram illustrating one embodiment of a computer.

FIG. 4 is a schematic block diagram illustrating one embodiment of the computer 105. In the depicted embodiment, the computer 105 includes a processor 405, a memory 410, and communication hardware 415. The memory 410 may include one or more of a semiconductor storage device, hard disk drive, an optical storage device, a micromechanical storage device, or the like. The memory 410 may store code. The processor 405 may execute the code.

The communication hardware 415 may communicate with other devices including but not limited to the logic circuit 140 and a screen. In one embodiment, the processor 405 may write the device access value to the device access value register 145 through the communication hardware 415 and the command bus 160. In addition, the processor 405 and/or communication hardware 415 may communicate the device mount status 205 over the command bus 160. In one embodiment, the processor 405 may lock the screen, wherein a user may not access the computer 105 until the screen is unlocked.

Figure 5A:
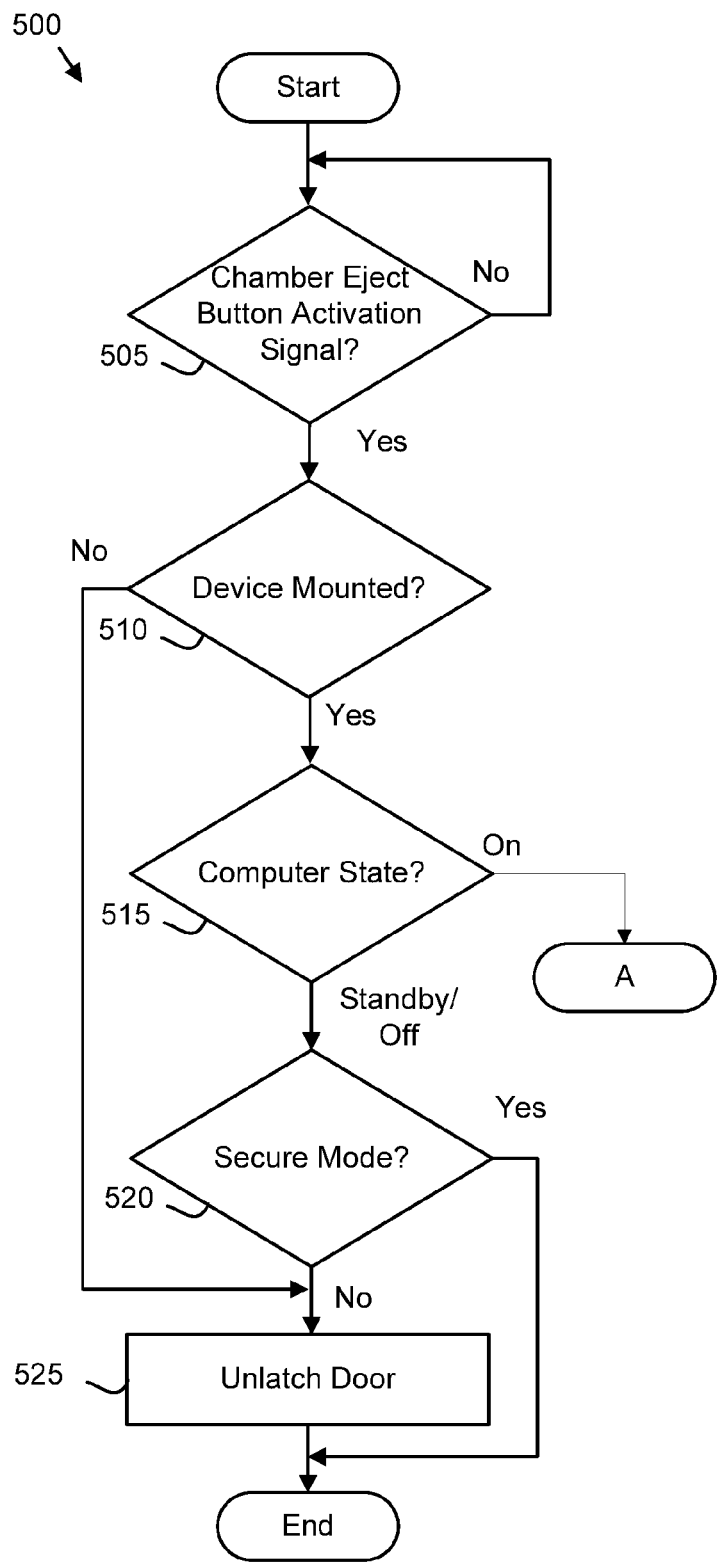
FIGS. 5A-B are schematic flow chart diagrams illustrating one embodiment of a secure device chamber method.
Figure 5B:
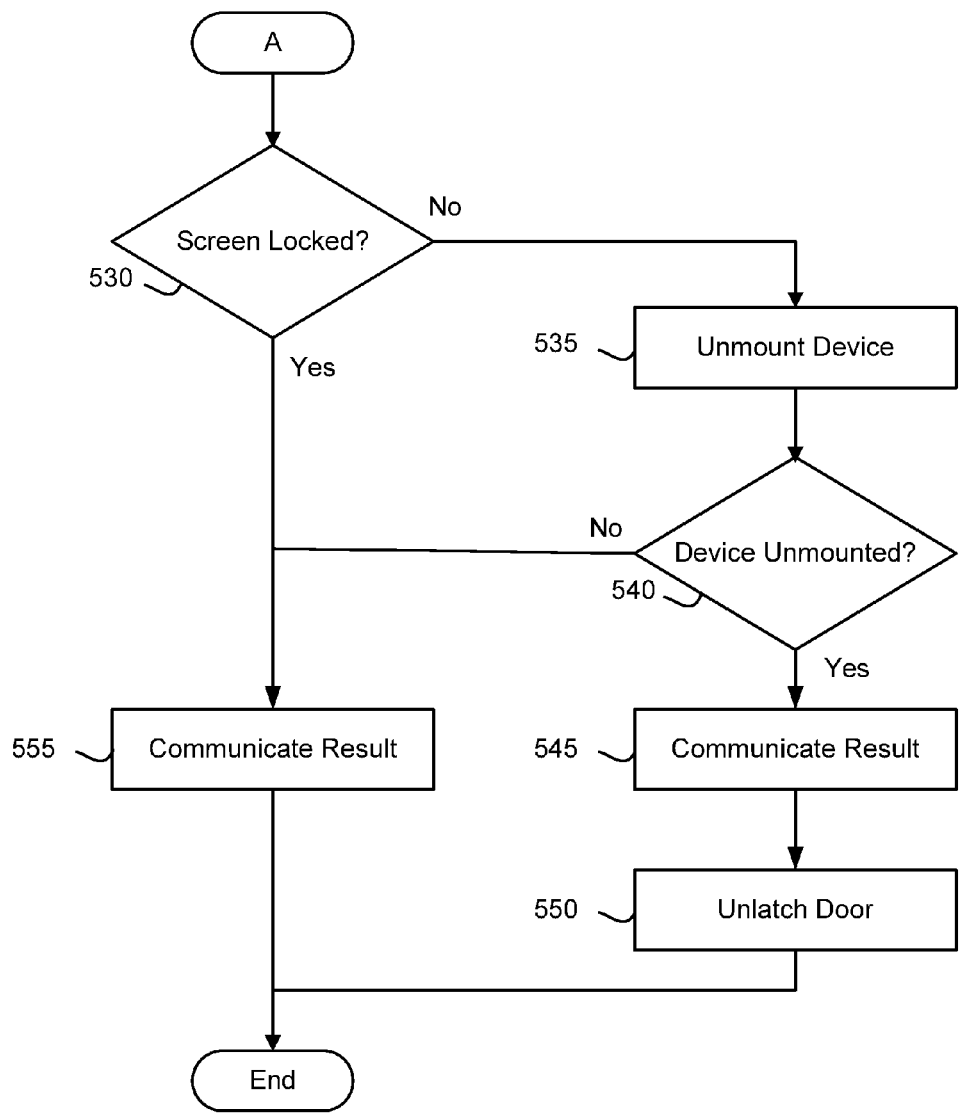

FIGS. 5A-B are schematic flow chart diagrams illustrating one embodiment of a secure device chamber method 500. The method 500 may be performed by the logic circuit 140 and/or the computer 105.

The method 500 starts, and in one embodiment, the logic circuit 140 determines 505 if the chamber eject button activation signal 210 is asserted. If the chamber eject button activation signal 210 is not asserted, the logic circuit 140 loops to determine 505 if the chamber eject button activation signal 210 is asserted.

If the chamber eject button activation signal 210 is asserted, the logic circuit 140 may determine 510 if the device 185 is mounted to the device port 125. The logic circuit 140 may determine 510 that the device 185 is mounted if the device installed signal 215 is asserted. Alternatively, the logic circuit 140 may interrogate the communication hardware 415 to determine if the device 185 is mounted.

If no device 185 is mounted to the device port 125, the logic circuit 140 asserts the latch solenoid control 170 and unlatches 525 the door 115. If the device 185 is mounted to the device port 125, the logic circuit 140 may determine 515 a computer state. The logic circuit 140 may determine 515 the computer state from the computer state signal 165.

If the logic circuit 140 determines 515 that the computer state is a standby mode and/or powered off, the logic circuit 140 determines 520 if the device access value is the device secure mode. In one embodiment, the computer 105 may set the device access value to the device secure mode in response to the device 185 been mounted in the device port 125. The computer 105 set the device access value over the command bus 160. Alternatively, the computer 105 may set the device access value to the device released mode in response to the device 185 being unmounted from the device port 125.

If the device access value is not the device secure mode, the logic circuit 140 asserts the latch solenoid control 170 and unlatches 525 the door 115. Thus the logic circuit 140 unlatches 525 the door 115 in response to the activation of the chamber eject button 195, the computer 105 being in the standby mode, and the device access value not being the device secure mode. Alternatively, the logic circuit 140 unlatches 525 the door 115 in response to the activation of the chamber eject button 195, the device 185 being installed in the device port 125 and/or device chamber 180, the computer 105 being in the standby mode, and the device access value not being the device secure mode. If the device access value is the device secure mode, the logic circuit 140 does not unlatch the door 115 and the method 500 ends. Thus the logic circuit 140 does not unlatch the door 115 in response to the device access value being the device secure mode.

If the logic circuit 140 determines 515 that the computer state is on, the logic circuit 140 may communicate an unmount device request to the computer 105 over the command bus 160. In response to the unmount device request, the computer 105 may determine 530 if the screen is locked. If the screen is locked, the computer 105 may communicate 555 a result that the screen is locked and the device 185 is not unmounted and the method 500 ends without unlatching the door 115. The computer 105 may communicate 555 the result over the command bus 160.

If the screen is not locked, the computer 105 may unmount 535 the device 185. In addition, the computer 105 may determine 540 if the device 185 is unmounted. If the device 185 is not unmounted, the computer 105 may communicate 555 the result that screen is not locked and the device 185 is not unmounted and the method 500 ends without unlatching the door 115.

If the device 185 is unmounted, the computer 105 may communicate 545 the result that the device 185 is unmounted. The logic circuit 140 may receive the result that the device 185 is unmounted over the command bus 160. The logic circuit 140 may further assert the latch solenoid control 170 and unlatch 550 the door 115 and the method 500 ends. Thus the logic circuit 140 may unlatch the door 140 in response to the activation of the chamber eject button 195, the computer 105 being on, the screen not being locked, and the device 185 being unmounted. Alternatively, the logic circuit 140 may unlatch the door 140 in response to the activation of the chamber eject button 195, the device 185 being installed in the device port 125 and/or device chamber 180, the computer 105 being on, the screen not being locked, and the device 185 being unmounted.

The embodiments secure a device 185 in a device chamber 180 disposed in a chassis 111 of a computer 105. The device chamber 180 includes a device port 125 and a door 115 that latches to obstruct access to the device chamber 180. As a result, the device 185 is secured within the device chamber 180.

If the chamber eject button 195 is activated, the chamber eject button 195 may assert a chamber eject button activation signal 210. The logic circuit 140 may unlatch the door 115 so that the device 185 may be removed in response to the activation of the chamber eject button 195 and the device access value not being the device secure mode. Thus the device 185 may be accessed in response to the activation of the chamber eject button 195 and the satisfaction of other criteria, but is otherwise secured from removal and accidental data loss.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a device chamber disposed in a chassis and comprising a device port;
    a door that latches to obstruct access to the device chamber;
    a chamber eject button;
    a failsafe release that unlatches the door to permit access to the device chamber, wherein the failsafe release is disposed within the chassis of a computer; and
    a logic circuit that receives an uninterrupted power supply from the computer, stores a device access value, and unlatches the door in response to activation of the chamber eject button and the device access value not being a device secure mode.

2. The apparatus of claim 1, wherein the logic circuit further unlatches the door in response to the activation of the chamber eject button, the computer being one of off and in a standby mode, and the device access value not being the device secure mode.

3. The apparatus of claim 1, wherein the logic circuit further unlatches the door in response to the activation of the chamber eject button, the computer being on, a screen not being locked, and a device being unmounted.

4. The apparatus of claim 1, wherein the logic circuit does not unlatch the door in response to the computer being one of off and in a standby mode and the device access value being the device secure mode.

5. The apparatus of claim 1, wherein the logic circuit further unlatches the door in response to no device being mounted in the device port.

6. The apparatus of claim 1, wherein the device chamber and the door enclose a device mounted to the device port.

7. The apparatus of claim 1, wherein the device access value is set to a device released mode in response to a device being unmounted from the device port.

8. A method comprising:
    latching a door that obstructs access to a device chamber disposed in a chassis of a computer and comprising a device port;
    unlatching by use of a failsafe release, the door to permit access to the device chamber, wherein the failsafe release is disposed within the chassis; and
    unlatching, by use of a logic circuit, the door in response to activation of a chamber eject button and a device access value stored in the logic circuit not being a device secure mode.

9. The method of claim 8, wherein the logic circuit further unlatches the door in response to the activation of the chamber eject button, the computer being one of off and in a standby mode, and the device access value not being the device secure mode.

10. The method of claim 8, wherein the logic circuit further unlatches the door in response to the activation of the chamber eject button, the computer being on, a screen not being locked, and a device being unmounted.

11. The method of claim 8, wherein the logic circuit further does not unlatch the door in response to the computer being one of off and in a standby mode and the device access value being the device secure mode.

12. The method of claim 8, wherein the logic circuit further unlatches the door in response to no device being mounted in the device port.

13. The method of claim 8, wherein the device chamber and the door enclose a device mounted to the device port.

14. The method of claim 8, wherein the device access value is set to a device released mode in response to a device being unmounted from the device port.

15. The method of claim 8, wherein the logic circuit further unlatches the door in response to the device not being installed.

16. A system comprising:
    a computer disposed in a chassis;
    a device chamber disposed in the chassis and comprising a device port;
    a door that latches to obstruct access to the device chamber;
    a chamber eject button;
    a failsafe release that unlatches the door to permit access to the device chamber, wherein the failsafe release is disposed within the chassis; and
    a logic circuit that receives an uninterrupted power supply from the computer, stores a device access value, and unlatches the door in response to activation of the chamber eject button and the device access value not being a device secure mode.

17. The system of claim 16, wherein the logic circuit further unlatches the door in response to the activation of the chamber eject button, the computer being one of off and in a standby mode, and the device access value not being the device secure mode.

18. The system of claim 16, wherein the logic circuit further unlatches the door in response to the activation of the chamber eject button, the computer being on, a screen not being locked, and a device being unmounted.

19. The system of claim 16, wherein the logic circuit does not unlatch the door in response to the computer being one of off and in a standby mode and the device access value being the device secure mode.

* * * * *